July 26, 1966     J. R. BRANSTETTER ETAL     3,263,016
BLACK-BODY FURNACE

Filed Oct. 30, 1963     2 Sheets-Sheet 1

INVENTORS
J. ROBERT BRANSTETTER
ALLEN J. METZLER
BY
ATTORNEYS

July 26, 1966  J. R. BRANSTETTER ETAL  3,263,016
BLACK-BODY FURNACE
Filed Oct. 30, 1963  2 Sheets-Sheet 2
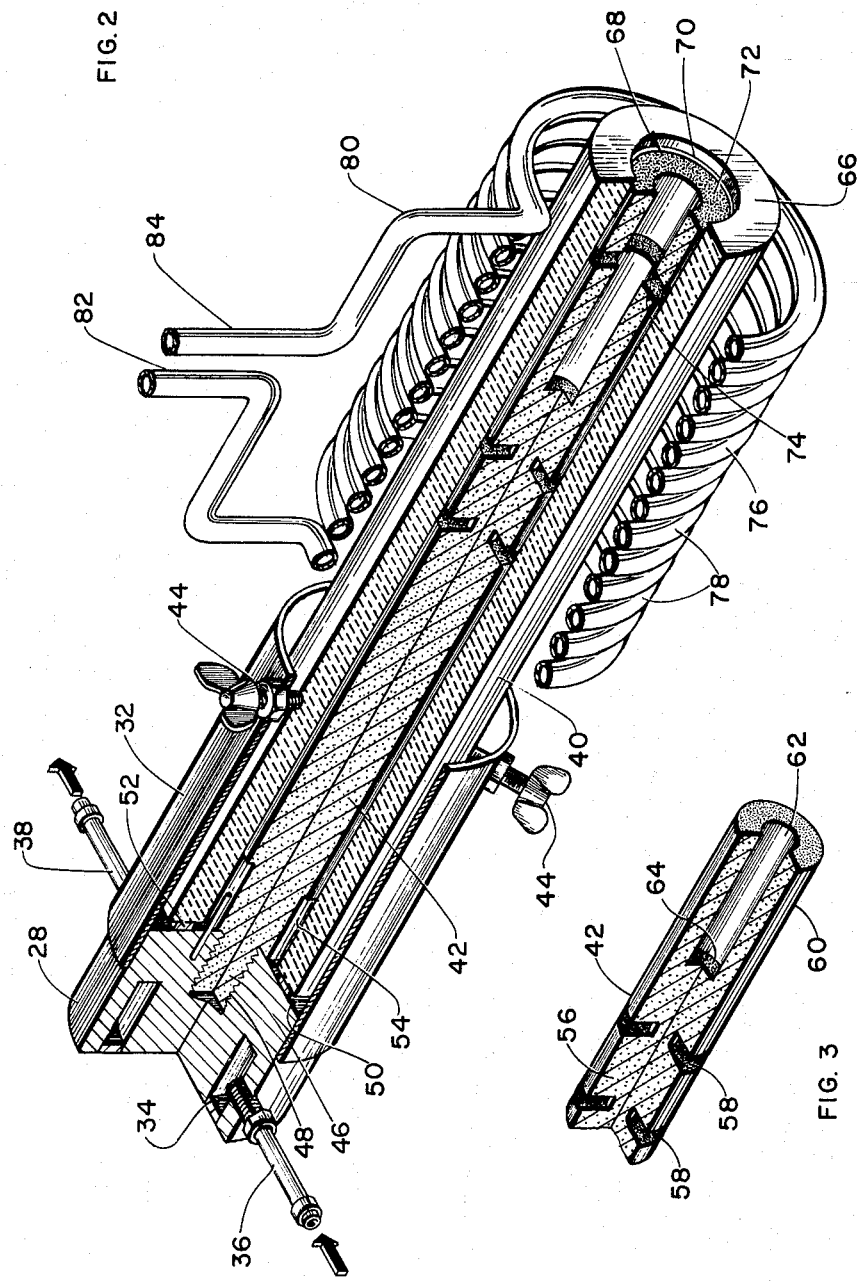
INVENTORS
J. ROBERT BRANSTETTER
ALLEN J. METZLER
BY
ATTORNEYS

United States Patent Office 3,263,016
Patented July 26, 1966

---

3,263,016
BLACK-BODY FURNACE
James Robert Branstetter, Avon, and Allen J. Metzler, Cleveland, Ohio, assignors to the United States of America as represented by the Administrator of the National Aeronautics and Space Administration
Filed Oct. 30, 1963, Ser. No. 320,233
4 Claims. (Cl. 13—26)

The invention described herein may be manufactured and used by or for the Government of the United States of America for governmental purposes without the payment of any royalties thereon or therefor.

The present invention relates, generally, to small, high temperature furnaces and, more particularly, to a fast response black-body furnace for radiant heat sensing instrument calibration.

Radiant heat sensing instruments such as pyrometers of both the monochromatic and two-color types are extensively used for both industrial and research purposes. Unfortunately, in use, calibration of these instruments may not be maintained so they must undergo periodic calibration to eliminate needless sources of error. Normally, for such calibration checks, a standard instrument is maintained for comparison. Comparison calibration of a pyrometer or other radiant heat sensing instrument then requires a radiation source upon which the two instruments may be sighted and the indicated temperatures compared. However, prior art calibration methods have relied on non-blackbody sources or blackbody sources with some absorptive media such as a quartz window or the like through which the temperature of the source is measured. Furnaces of both these types interpose errors in calibration for which correction is difficult. For instance, a clean quartz window has no effect on the temperature measured by a two-color instrument but depresses the indicated temperature of a monochromatic instrument. Additionally, these furnaces are somewhat complex in structure, and therefore expensive to fabricate and the time required for a multi-point calibration is extensive because of the slow temperature response.

Accordingly, it is an object of the present invention to provide a black-body source calibration furnace.

It is an additional object of the invention to provide a black-body source furnace capable of operation in air at ambient pressure.

It is yet another object of the invention to provide a calibration furnace in which no windows or other absorbing media are required.

It is still another object of the invention to provide a furnace that is easily fabricated and has a rapid temperature response.

A more complete appreciation of the invention and many attendant advantages thereof will be readily appreciated as the same becomes better understood by reference to the following detailed description when considered in connection with the accompanying drawings therein:

FIG. 2 is a view of the furnace and a portion of the supporting structure, partly in cross section; and FIG. 3 is a fragmentary view of the black-body source.

Figure 1:
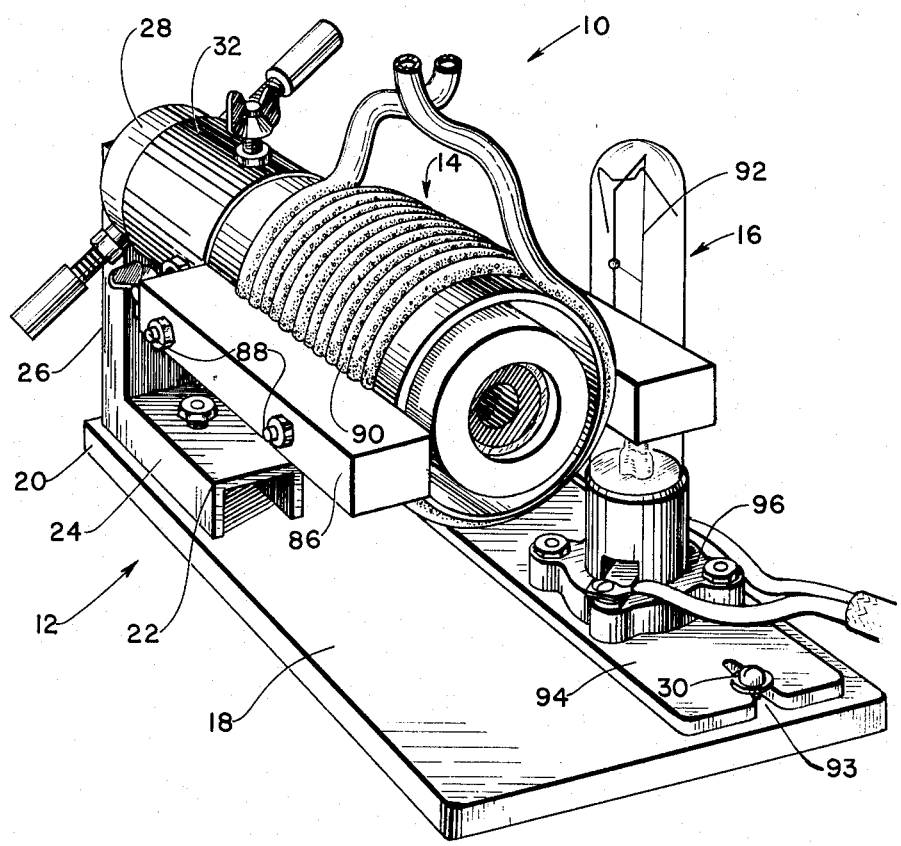
FIG. 1 illustrates in perspective a small high temperature furnace assembly in accordance with the present invention.

According to the present invention, the foregoing and other objects are obtained by providing a furnace having a black-body source formed in a hollowed graphite rod. The graphite rod is mounted from a water-cooled housing coaxially with an insulating sleeve and terminates short of the front portion of the sleeve. A guard ring assembly comprising a tubular insulating member and a carbon ring are disposed within the sleeve forward of the graphite rod to maintain a nonoxidizing atmosphere around this black-body source. Heat for the graphite rod is inductively provided by an RF coil which is also water cooled to prevent overheating and a base mounted filament lamp enables easy focusing on the most uniformly radiating wall of the black-body source. Surrounding the graphite rod and insulating sleeve is a thin metallic tubular member which is connected to the water-cooled housing and lends over-all rigidity to the structure.

Since this tubular member and the water-cooled housing serve as the only connection between the furnace and supporting assembly, excessive heat build-up in the supporting assembly is prevented.

Referring now to the drawings, there is shown in FIG. 1 a furnace assembly generally indicated by the numeral 10, constituting of a supporting structure 12 on which a furnace 14 and a sighting lamp 16 are disposed. As illustrated, the base 18 of the supporting structure 12 extends beneath the entire furnace 14 and also extends sideward therefrom a sufficient distance to accommodate the sighting lamp 16. Mounted on the base 18 adjacent the rearward portion 20 is a right angled channel member 22, the horizontal leg 24 of the right angled channel being attached to the base by bolts or the like and the vertical leg 26 of the channel extending upwardly for attachment to and support of the water-cooled housing 28. Screws or bolts 30 (only one being shown), advantageously, are also provided in the base 18 for attachment and positioning of the sighting lamp 16.

Furnace 14 is fixed to the supporting structure in cantilever fashion by being mounted to the supporting structure only through the aforementioned water-cooled housing 28 and a forwardly extending supporting sleeve 32, made either integral with the housing or welded or brazed thereto. Such a structural arrangement substantially isolates the furnace from the supporting structure and permits thermal build-up in the supporting structure to be easily controlled by the provision in housing 28 of radially extending cooling passage 34 (FIG. 2), supplied with cooling water by inlet and outlet connecting conduits 36 and 38, respectively.

The furnace 14 and supporting structure 12 are joined by insertion of furnace insulating sleeve 40 and carbon rod 42 in the supporting sleeve 32 and housing 28 of the supporting structure. Thumb screw clamps 44, threaded stud portion 46 of the carbon rod and drilled and tapped hole 48 of the housing provide an easily assembled, positive connection therebetween and also a coaxial alignment of the insulating sleeve 40 and carbon rod 42. The clamps 44, additionally, hold the sleeve 40 in abutting relation with the front face 50 of housing 28, a sealing ring or gasket 52 of asbestos or the like being disposed between the sleeve and housing to insure a seal and protect the carbon rod from the atmosphere upon heating of the furnace.

Although the insulating sleeve 40 may be made from any insulating material capable of withstanding high temperature, in practice, 8 mesh, zirconia, castable ceramic was utilized in its formation. After moulding, this sleeve should be cured at 3250° F. to insure high strength at elevated temperatures. The cylinder formed in this operation, advantageously, has a hollow core 54 with a diameter slightly larger than the outside diameter of the carbon rod 42 so that, as assembled, heat conduction between the carbon rod and insulating sleeve is minimized and reaction between the rod and insulating sleeve is prevented.

Graphite or carbon rod 42 was formed from a block of carbon (over 99% purity) having an average density of 1.73 and an average tensile strength of 1790 p.s.i. with the grain and 1420 p.s.i. across the grain by machining the block so that the axis of the rod was parallel to the carbon grain to thereby insure maximum strength of this cantilevered member. As best seen in FIG. 3, the rod is then provided with a slotted portion 56 having two radially extending peripheral grooves 58 which reduce axial thermal losses and the temperature gradient along the axis of rod. At the front portion 60 of the carbon rod, a cylindrical depression or radiating chamber 62 having a flat rear face 64 is formed. This face 64 serves as the black-body source upon which the radiant heat sensing instruments are focused.

Since the front 66 of the furnace is open, guard ring assembly 68 comprising a ceramic tube 70 and a carbon ring 72 is provided to protect the carbon rod 42 from oxidation. The tube 70 may be made of any high temperature ceramic such as zirconium oxide which will withstand the thermal stress and will not react with carbon and is assembled with the carbon ring 72 by machining the ring so that it is inserted within the tube with a slip fit. The guard ring assembly is then placed within the insulating sleeve in closely contiguous relation with the front face 74 of the carbon rod to diminish heat loss and minimize air circulation between the rod and insulating sleeve 40.

Heating of the graphite cylinder is accomplished by induction heating by RF coil 76 formed from a number of turns 78 of copper tubing 80. As in normal RF practice, cooling water is circulated through the load coil, being supplied thereto at inlet and outlet 82 and 84, respectively. The coil 76 is additionally provided with reinforcing blocks 86 which are clamped to the coil through bolts 88 brazed to individual turns 78. Additional rigidity is also supplied thereto by the use of a zirconia filling 90 between the individual turns of the coil, the zirconia also acting as insulation between the individual turns and a radiation reflector.

In operation, power is supplied to the RF coil 76 by any conventional means (not shown) to induce current in the carbon rod 42 and rapidly raise its temperature. Since the carbon ring 72 of the guard ring assembly is exposed to the atmosphere and also heated by the RF coil, it partially oxidizes and provides a protective atmosphere that blankets the open front end 66 of the furnace and reduces to a minimum oxidation of the carbon rod. At the same time, because of the small mass of the furnace, an equilibrium condition (constant temperature of the source) is quickly reached for any given step power input and comparison calibration may easily be accomplished.

Although the major portion of the radiating cavity assumes a fairly uniform temperature, in practice, it has been found that there is a slight variation in axial temperature along its length, but the backface of the cavity provides a surface of uniform temperature and an emissivity of 0.99. In practice, therefore, to obtain an extremely accurate comparison calibration, it has been found advantageous accurately to focus the radiant heat measuring instruments against this face.

The sighting lamp 16 is provided for this purpose and is disposed so that its filament 92 is in the same vertical plane as the rear, flat face of the radiating chamber. Mounting of the lamp in the desired location is facilitated by the provision of the mount 94 to which the lamp is fixed by its base 96, slots 93 (only one shown) providing ease in adjusting for the proper focus plane. A radiant heat sensing instrument such as a pyrometer may then be focused on the filament of the lamp from a sufficient distance away (for example 16–20 inches) and then turned through the required small angle to obtain a focus directly on the back radiating face.

A preferred embodiment of the invention has been shown and particularly described for the purposes of explaining the principle of operation of the invention and showing its application, but it will be obvious to those skilled in the art that many modifications and variations are possible, and it is intended, therefore, to cover all such modifications and variations as fall fully within the scope of the invention as defined in the appended claims.

What is claimed is:

1. A high temperature calibration furnace assembly comprising:
   a supporting structure and a furnace;
   said supporting structure including a water-cooled housing and a sleeve affixed thereto, said housing and sleeve connected to and supporting said furnace whereby excessive heat build-up in the supporting structure is prevented;
   said furnace including a heating source, a zirconium oxide insulating sleeve, a carbon rod, and a guard assembly; said carbon rod comprising a front portion having a radiating chamber including a radiating back face and a rear portion having radial slots whereby axial heat losses are reduced; said carbon rod and guard assembly disposed within said insulating sleeve and coaxially aligned therewith; said heating source disposed around said insulating sleeve and providing RF heating to said carbon rod;
   said guard ring assembly disposed forwardly of said carbon rod and comprising a zirconium oxide outer ring and a carbon guard ring disposed therein whereby heating causes the carbon guard ring to oxidize providing a protective atmosphere for the carbon rod.

2. The high temperature calibration furnace assembly set forth in claim 1 including a sighting lamp mounted on said supporting structure contiguous to said furnace, said sighting lamp having a filament, said filament disposed in the same plane as the back radiating face of said radiating chamber whereby easy focussing for calibration is obtained.

3. A supporting structure for a high temperature calibration furnace assembly of the type having an RF heated carbon rod with a radiating chamber in the front portion thereof and radial slots in the rear portion to reduce heat losses, said support structure comprising
   a water-cooled housing at the rear of the carbon rod, and
   a sleeve affixed to said housing, said housing and sleeve connected to and supporting said furnace whereby excessive heat build-up in the supporting structure is prevented.

4. Apparatus as set forth in claim 3 including a sighting lamp mounted contiguous to the furnace, said sighting lamp having a filament disposed in the same plane as the back radiating face of the radiating chamber whereby easy focusing for calibration is obtained.

References Cited by the Examiner

UNITED STATES PATENTS

| | | | |
|---|---|---|---|
| 697,877 | 8/1901 | Bremer | 313—357 |
| 2,527,294 | 10/1950 | Bailey | 313—357 X |
| 2,603,669 | 7/1952 | Chappell | 313—357 X |
| 2,673,228 | 3/1954 | Kistler | 13—26 |
| 2,704,817 | 3/1955 | Millie | 313—357 X |
| 2,952,762 | 9/1960 | Williams et al. | 250—85 |
| 3,036,888 | 5/1962 | Lowe | 13—26 X |
| 3,138,697 | 6/1964 | Banca et al. | 219—553 X |

OTHER REFERENCES

The Review of Scientific Instruments, "Blackbody Source Unit with Electronic Temperature Control," January 1952, vol. 23, No. 1, pages 52–53.

RICHARD M. WOOD, *Primary Examiner.*

ANTHONY BARTIS, *Examiner.*

V. Y. MAYEWSKY, *Assistant Examiner.*